US005810303A

United States Patent [19]

Bourassa et al.

[11] Patent Number: 5,810,303

[45] Date of Patent: Sep. 22, 1998

[54] STUD BRACKET TO MOUNT A WIRING BOX TO A STUD

[75] Inventors: Alain Bourassa; Sylvain Poissant, both of Laval; Alain Legris; Claude Lacroix, both of Montréal, all of Canada

[73] Assignee: Temco Electric Products Company, Inc., Montreal, Canada

[21] Appl. No.: 910,795

[22] Filed: Aug. 13, 1997

[51] Int. Cl.[6] .................... A47B 96/06

[52] U.S. Cl. .................... 248/205.1; 174/58; 248/300; 248/906

[58] Field of Search .................... 248/205.1, 27.1, 248/300, 906; 174/58; 220/3.9

[56] References Cited

U.S. PATENT DOCUMENTS

| | | | |
|---|---|---|---|
| 1,225,525 | 5/1917 | Sweet . | |
| 2,374,622 | 4/1945 | Rugg | 174/58 |
| 4,447,030 | 5/1984 | Nattel | 248/27.1 |

FOREIGN PATENT DOCUMENTS

| | | |
|---|---|---|
| 1138086 | 12/1982 | Canada . |
| 1148645 | 6/1983 | Canada . |
| 1192294 | 8/1985 | Canada . |
| 1239214 | 7/1988 | Canada . |
| 1252191 | 4/1989 | Canada . |
| 2016953 | 5/1990 | Canada . |
| 1272522 | 8/1990 | Canada . |
| 1275486 | 10/1990 | Canada . |
| 1280199 | 2/1991 | Canada . |
| 1297976 | 3/1992 | Canada . |
| 1301297 | 5/1992 | Canada . |
| 1307577 | 9/1992 | Canada . |
| 1307578 | 9/1992 | Canada . |
| 2028656 | 4/1993 | Canada . |
| 1317366 | 5/1993 | Canada . |

*Primary Examiner*—Ramon O. Ramirez
*Attorney, Agent, or Firm*—Darby & Darby

[57] ABSTRACT

The stud bracket is used for mounting an electrical wiring box on a stud, particularly a metal stud. The bracket is made of a single sheet of a hand-deformable material. It comprises two initially flat leg portions which are initially provided in an L-shaped configuration. The first leg portion features a lateral strip used to either grip an edge of a metal stud or serve as a positioning guide. The second leg portion comprises an outer section surrounding an elongated inner strip that is delimited by a continuous cut leaving only an end of the inner strip, opposite the first leg portion, integral with the outer section. The bracket is very versatile and allows the electrical wiring box to be connected without tools to various positions on a wide variety of studs.

8 Claims, 7 Drawing Sheets

STUD BRACKET TO MOUNT A WIRING BOX TO A STUD

BACKGROUND

In the art of electrical wiring box arrangements, a stud bracket is a part used in conjunction with an electrical wiring box to connect it to an adjacent stud. It is generally used with elongated metal studs made of a light gauge metal and of the type having a central web portion and two opposite flanges.

Unlike wood studs, it is difficult to directly connect an electrical wiring box to a metal stud by using fasteners inserted according to an oblique path with reference to the surface of the metal stud. A stud bracket is then connected on the side of an electrical wiring box and used as a side extension to allow fasteners, usually screws, to be inserted at right angle with reference to the metal stud. It features deformable sections that allow the electrical wiring box to be secured to the metal stud before the insertion of the screws or in substitution thereof. One drawback of conventional stud brackets is that the electrical wiring box would not hold to the adjacent metal stud unless the installer uses a tool, such as pliers or the like, to crimp the sides of the bracket. As a result, whenever screws are used, the installer has to use a crimping tool to hold the electrical wiring box in place or use one hand prior to the insertion of the first screw. Another drawback is that it is difficult to align the electrical wiring box in an offset position with the door frame during its installation because no suitable positioning guide is provided.

SUMMARY

The present invention provides an improved stud bracket which features a simple and versatile design that avoids the drawbacks associated with the conventional stud brackets.

The stud bracket according to the present invention is used for mounting an electrical wiring box on a stud. It is made of a single sheet of a hand-deformable material and comprises a first leg portion having a first edge and a second edge opposite the first edge. The first leg portion comprises an initially flat main section and a lateral strip delimited by two opposite cuts originating from the first edge and having an end integral with the main section. The stud bracket further comprises a second leg portion that is initially projecting at substantially right angle from the second edge of the first leg portion. The second leg portion comprises an initially flat outer section and an inner strip surrounded by the outer section and initially flat and coplanar therewith. The inner strip is delimited by a continuous cut leaving only an end of the inner strip, opposite the second edge of the first leg portion, integral with the outer section.

A non restrictive description of preferred embodiments will now be given with reference to the appended drawings.

IDENTIFICATION OF THE COMPONENTS

Figure 1:
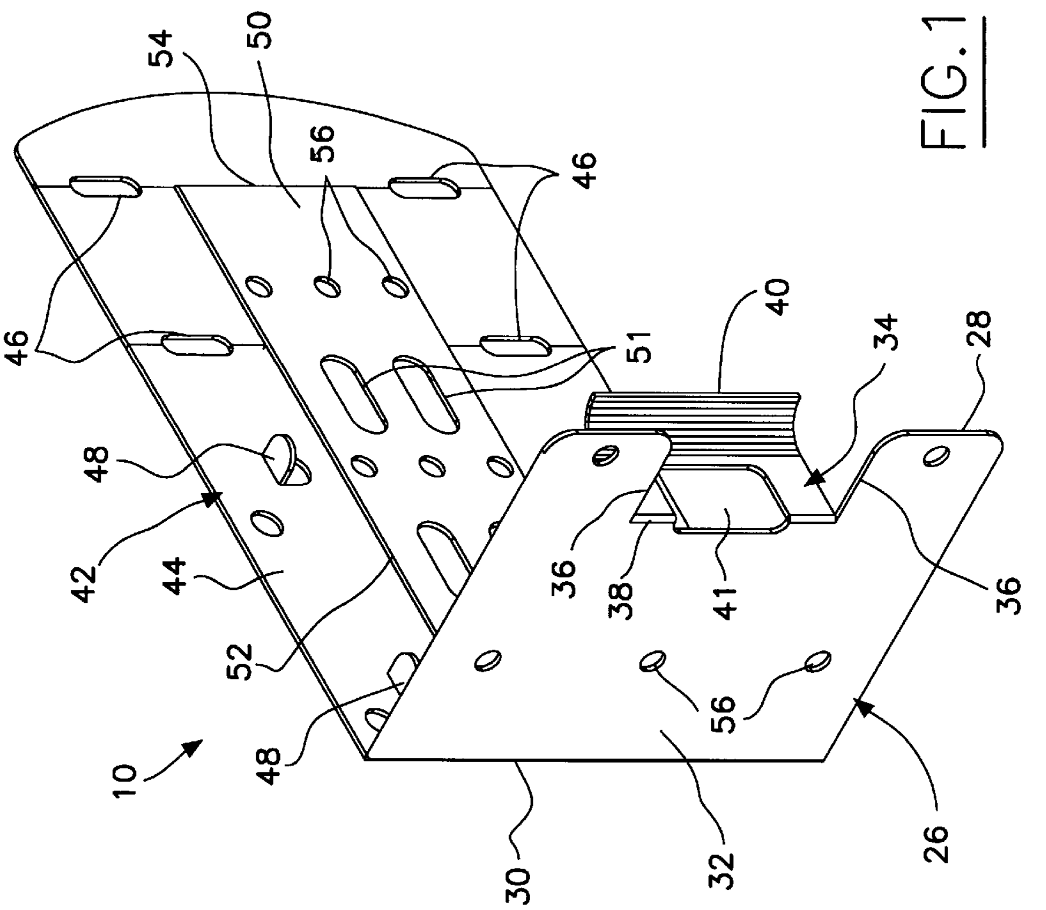
FIG. 1 is a perspective view of the stud bracket according to a possible embodiment of the present invention.
Figure 2:
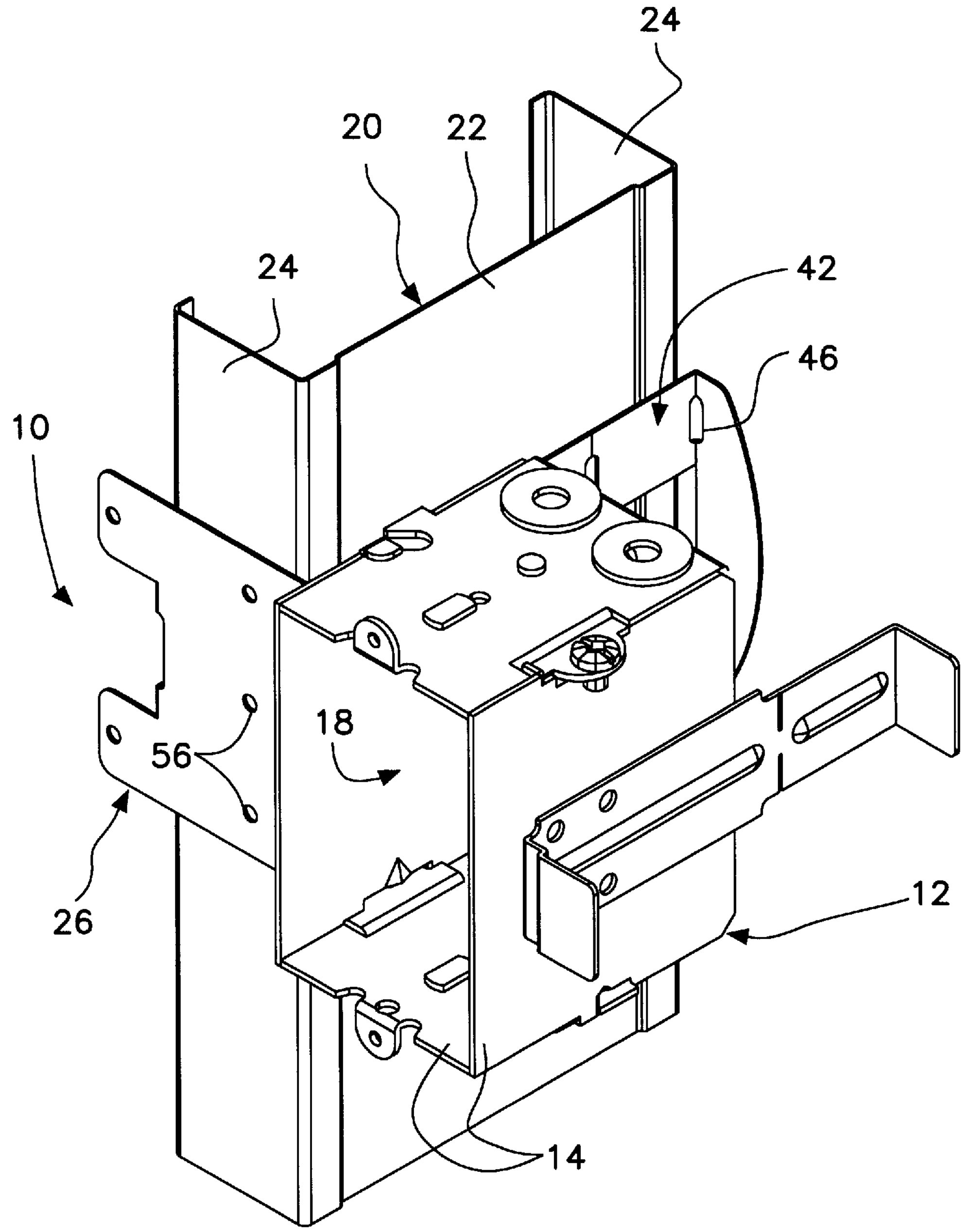
FIG. 2 is a side perspective view of an electrical wiring box with the bracket of FIG. 1, shown when mounted on the side of a metal stud.

The following is a list of the reference numerals, along with the names of the responding components, that are used in the appended drawings and in the description.

10 stud bracket
12 electrical wiring box
14 side walls
16 rear wall
18 front opening
20 stud
22 central web portion
24 flanges (of the stud)
26 first leg portion
28 first edge (of the first leg portion)
30 second edge (of the first edge portion)
32 flat main section
34 lateral strip
36 two opposite cuts
38 end (of the lateral strip)
40 curved free end (of the lateral strip)
41 opening (of the lateral strip)
42 second leg portion
44 flat outer section (of the second leg portion)
46 oblong openings (of the outer section)
48 tabs
50 inner strip (of the second leg portion)
51 oblong openings (of the inner strip)
52 continuous cut
54 end (of the inner strip)
56 fastener-receiving holes
58 fasteners

DESCRIPTION

Referring now to FIG. 1, there is shown a stud bracket (10) according to a possible embodiment of the present invention. The bracket (10) is adapted to be connected on the side of a conventional electrical wiring box (12), such as the one shown in FIGS. 2 to 7. The electrical wiring box (12) is usually made of metal, although other materials such as plastic are also suitable. It basically comprises four side walls (14) and a rear wall (16). Each side wall (14) is connected to an adjacent side wall (14) and to the rear wall (16) for defining a generally rectangular housing having a front opening (18).

The bracket (10) is connected to the electrical wiring box (12) with conventional means, such as screws, rivets, spot welding, etc. It is primarily used for mounting the electrical wiring box on an elongated metal stud (20) made of a light gauge metal and of the type having a central web portion (22) and two opposite flanges (24). It is also possible to mount the electrical wiring box (12) on a wood stud or on any suitable structure.

The bracket (10) is made of a single sheet of a hand-deformable material, such as light gauge galvanized steel. The bracket (10) comprises a first leg portion (26) and a second leg portion (42), which are initially provided in an L-shaped configuration. The first leg portion (26) is delimited by a first edge (28) and a second edge (30) opposite the first edge (28). The second leg portion (42) is initially projecting at a substantially right angle from the second edge (30) of the first leg portion (26).

The first leg portion (26) comprises an initially flat main section (32) and a lateral strip (34). The lateral strip (34) is delimited by two opposite cuts (36), each preferably of about 0.5 inch, originating from a first edge (28) of the first leg portion (26) and having an end (38) integral with the main section (32). Preferably, the lateral strip (34) comprises a curved free end (40), opposite the end (38) integral with the main section (32) and a substantially rectangular central opening.

The second leg portion (42) of the bracket (10) comprises an initially flat outer section (44) and an inner strip (50). The second leg portion (42) is preferably longer than the first leg portion (26). The inner strip (50) is surrounded by the outer section (44) and initially flat and coplanar therewith. The inner strip (50) is delimited by a continuous cut (52) leaving only an end (54) of the inner strip (50), opposite the second edge (28) of the first leg portion (26), integral with the outer section (44).

Figure 3:
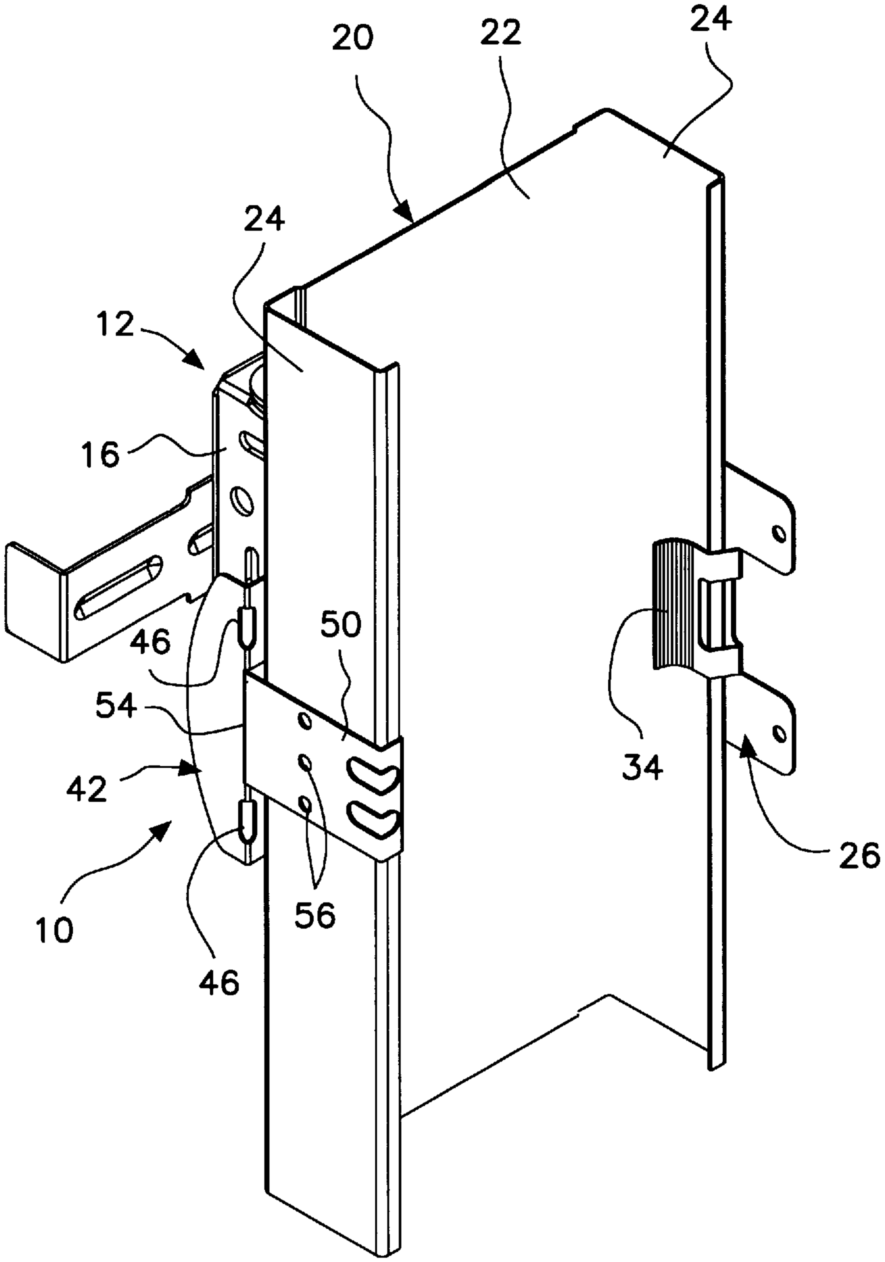
FIG. 3 is a rear perspective view of the electrical wiring box and the bracket shown in FIG. 2.
Figure 4:
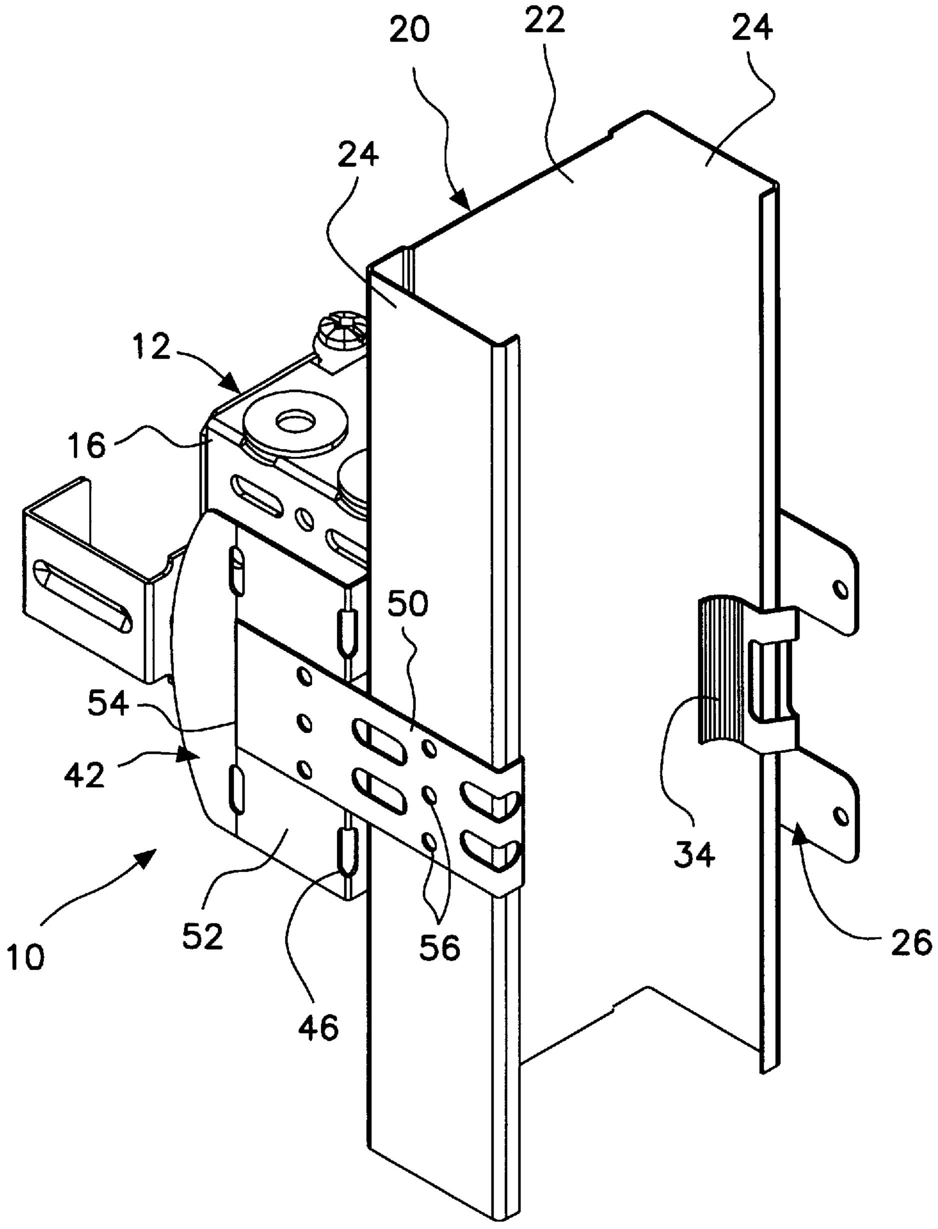
FIG. 4 is a view similar to FIG. 3, showing the electrical wiring box and the bracket mounted on a smaller metal stud.
Figure 5:
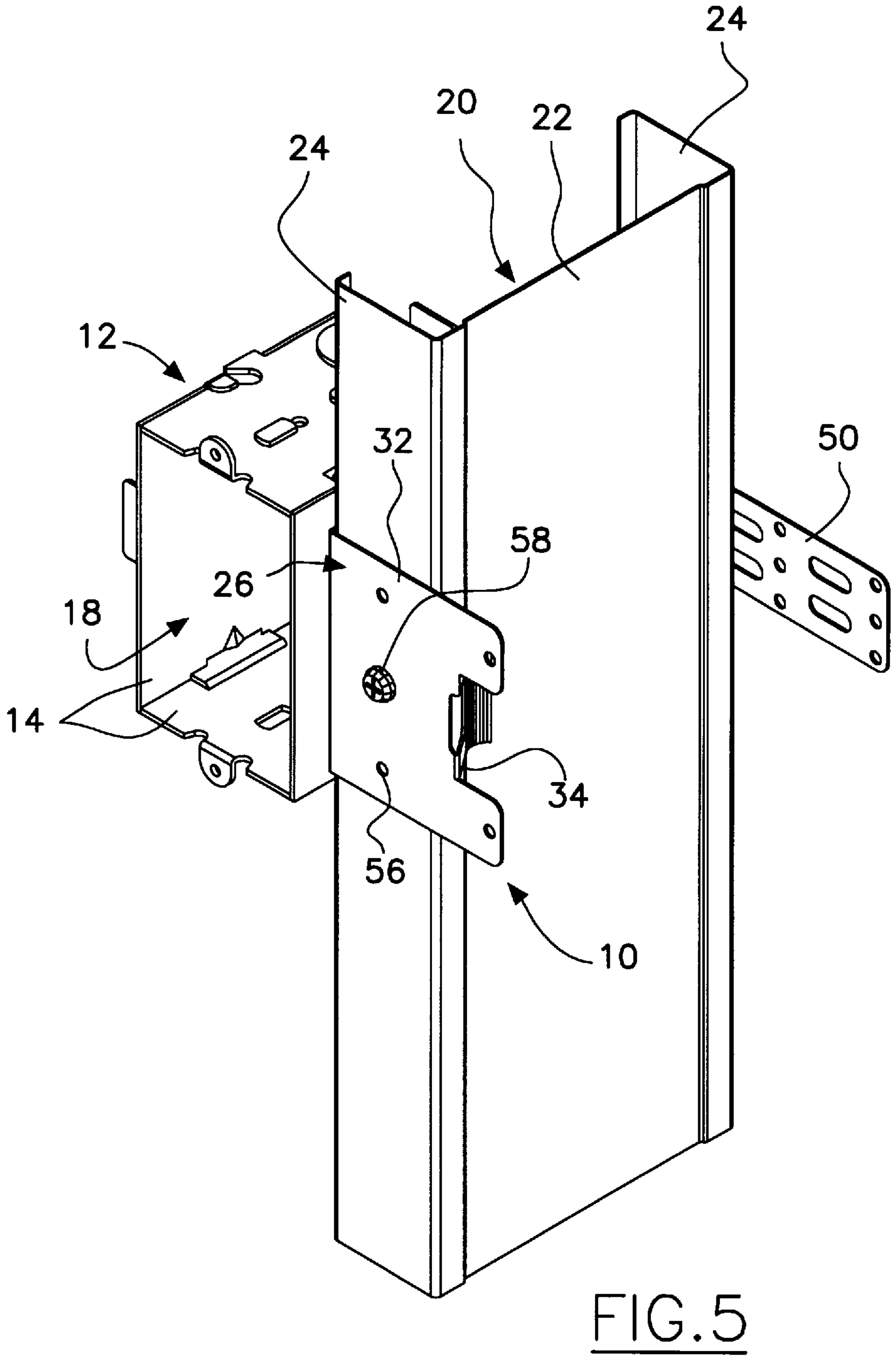
FIG. 5 is a side perspective view of an electrical wiring box and the bracket of FIG. 1, shown when mounted on the open side of the metal stud.
Figure 6:
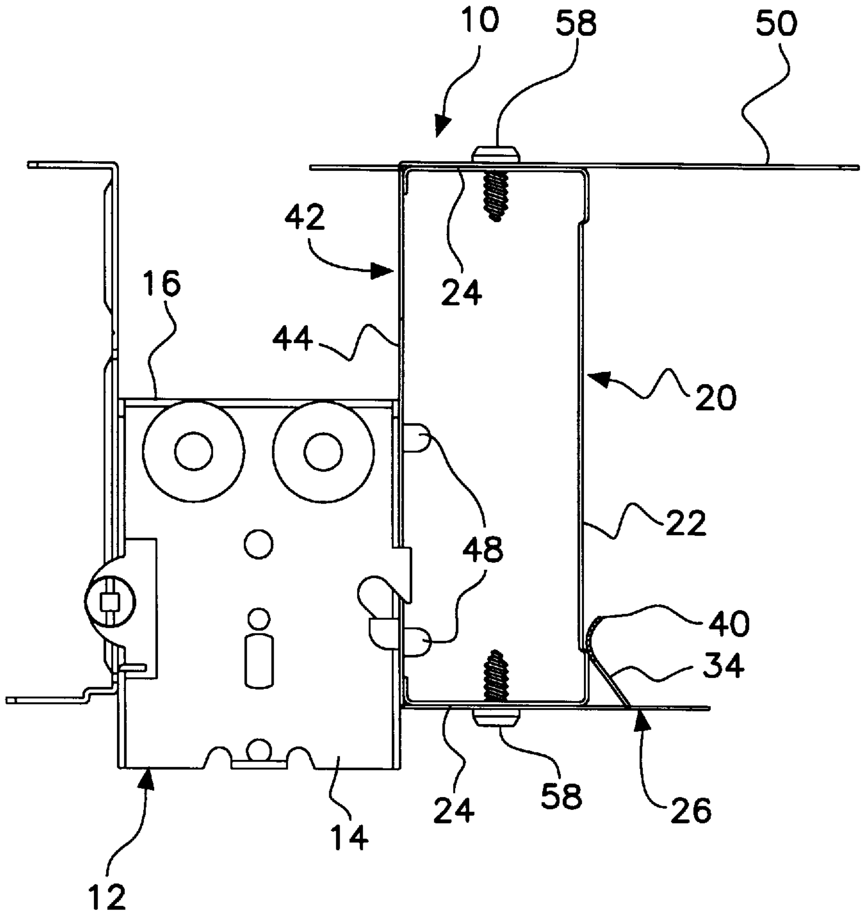
FIG. 6 is an upper view of the electrical wiring box, the bracket and the stud shown in FIG. 5.

The outer section (44) of the second leg portion (42) comprises at least one pair of oblong openings (46). The oblong openings (46) of each pair are aligned with each other and located on a respective side of the outer section (44), each oblong opening extending perpendicularly with reference to the inner strip (50). These oblong openings (46) are used as a reference when deforming the outer section (44). The spacing between the pairs of oblong openings (46) is preferably made in accordance with the various widths of the studs (20). As shown in FIG. 3, a pair of oblong openings (46) is aligned with the end (54) of the inner strip (50) that is integral with the outer section (44). Preferably, the inner strip (50) also comprises oblong holes (51). These oblong openings (51) are oriented longitudinally to facilitate the crimping of the inner strip (50). However, they do not form a deforming path, like the oblong openings (46) of the outer section (44). As best shown in FIGS. 1 and 6, the outer section (44) of the second leg portion (42) comprises at least two pairs of tabs (48) projecting perpendicularly in a direction parallel to the first leg portion. At least one of the pairs of tabs (48) is adjacent to the second edge (30) of the first leg portion (26). The main function of the tabs (48) is to keep a small space between the web (22) of the stud (20) and the second leg portion (42) of the bracket (10) when they are side by side, such as in FIGS. 2 to 5. It is further possible to provide tabs (48) with sharp ends (not shown), allowing the tabs (48) to be inserted into wood studs.

Figure 7:
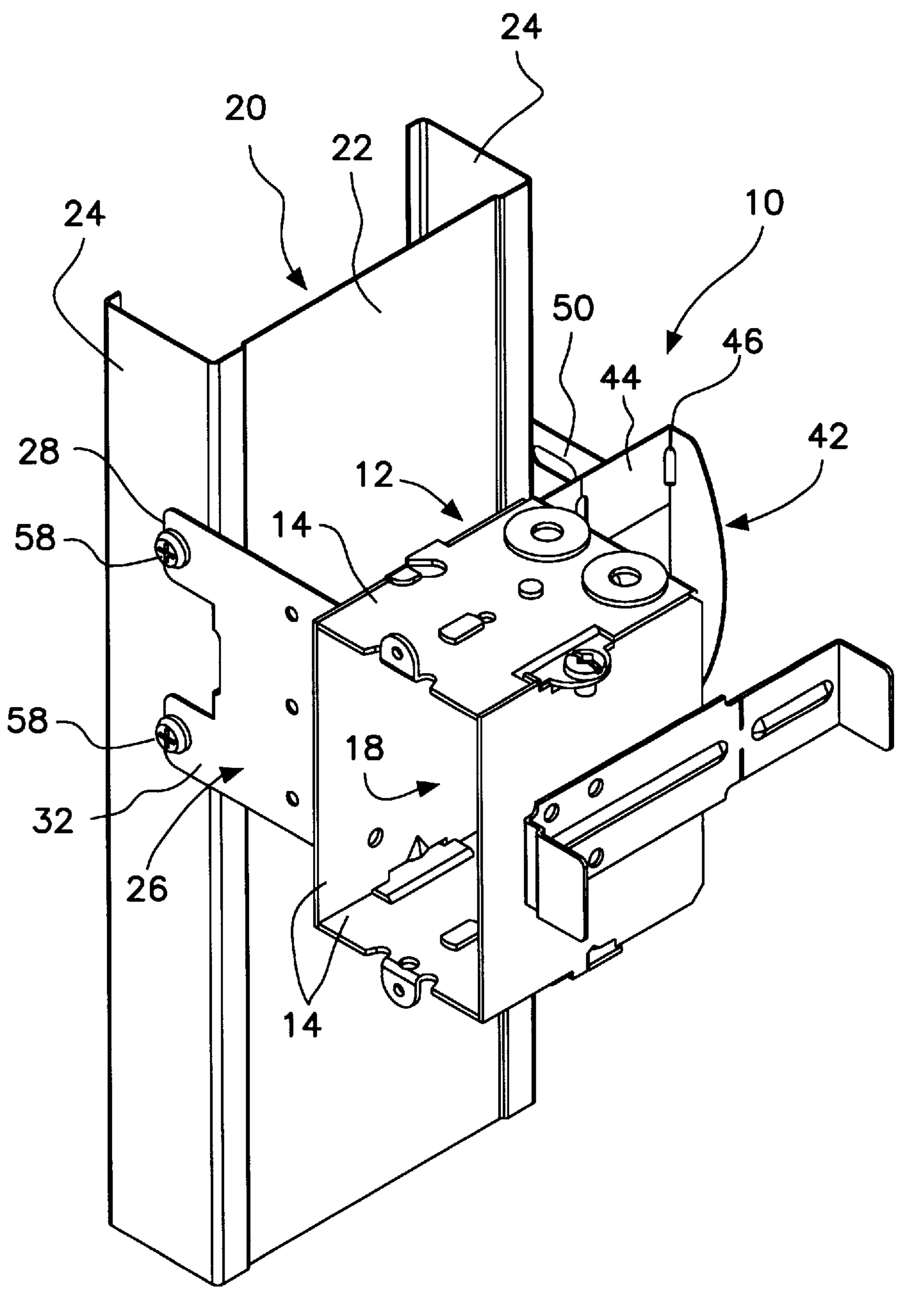
FIG. 7 is a side perspective view of an electrical wiring box and the bracket in an offset position.

The bracket (10) comprises a plurality of fastener-receiving holes (56). These holes (58) are located in various locations, such as the main section (32), the outer section (44) and the inner strip (50). FIGS. 5 to 7 show views of the bracket (10) with fasteners (58), more particularly screws in the present case. The fasteners (58) are used to secure firmly the bracket (10) on the stud (20).

In FIG. 7, the bracket (10) is secured in an offset position with reference to the stud (20). In that case, the fasteners (58) are inserted through holes near the first edge (28) of the first leg portion (28). The lateral strip (34) then acts as a positioning guide.

Although preferred embodiments of the invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A stud bracket for mounting an electrical wiring box on a stud, the bracket being made of a single sheet of a hand-deformable material and comprising:

- a first leg portion having a first edge and a second edge opposite the first edge, the first leg portion comprising:
  - an initially flat main section; and
  - a lateral strip delimited by two opposite cuts originating from the first edge and having an end integral with the main section; and
- a second leg portion that is initially projecting at substantially right angle from the second edge of the first leg portion, the second leg portion comprising:
  - an initially flat outer section; and
  - an inner strip surrounded by the outer section and initially flat and coplanar therewith, the inner strip being delimited by a continuous cut leaving only an end of the inner strip, opposite the second edge of the first leg portion, integral with the outer section.

2. A stud bracket according to claim 1, wherein the lateral strip comprises a curved free end, opposite the end integral with the main section.

3. A stud bracket according to claim 2, wherein the lateral strip comprises a substantially rectangular central opening.

4. A stud bracket according to claim 1, wherein the outer section of the second leg portion comprises at least one pair of oblong openings, the oblong openings of each pair being aligned with each other and located on a respective side of the outer section, each oblong opening extending perpendicularly with reference to the inner strip.

5. A stud bracket according to claim 4, wherein at least one pair of oblong openings is aligned with the end of the inner strip that is integral with the outer section.

6. A stud bracket according to claim 1, wherein the outer section of the second leg portion comprises at least two spaced-apart pairs of tabs projecting perpendicularly in a direction parallel to the first leg portion, at least one of the pairs of tabs being adjacent to the second edge of the first leg portion.

7. A stud bracket according to claim 1, wherein the stud bracket comprises a plurality of fastener-receiving holes.

8. A stud bracket according to claim 1, wherein the inner strip further comprises a plurality of longitudinally-oriented oblong openings.

* * * * *